US006527491B1

United States Patent
Uchimoto et al.

(10) Patent No.: US 6,527,491 B1
(45) Date of Patent: Mar. 4, 2003

(54) DRIVING FIT RIVET MADE OF ALUMINUM (75) Inventors: Yukio Uchimoto, Kaga (JP); Masaya Asakami, Ishikawa (JP); Kiyohsi Shimizu, Fukui (JP); Yoshito Zeniya, Kaga (JP)

(73) Assignee: Sunlux Corporation, Osaka (JP)

( * ) Notice: Subject to any disclaimer, the term of this patent is extended or adjusted under 35 U.S.C. 154(b) by 0 days.

(21) Appl. No.: 09/727,376

(22) Filed: Nov. 28, 2000

(30) Foreign Application Priority Data

May 31, 2000 (JP) ........................................ 2000-162294
Oct. 26, 2000 (JP) ........................................ 2000-327168

(51) Int. Cl.$^7$ ............................ F16B 19/04; F16B 19/06
(52) U.S. Cl. ........................ 411/504; 411/506; 411/901
(58) Field of Search ................................ 411/452, 504, 411/505, 506, 507, 901

(56) References Cited

U.S. PATENT DOCUMENTS 1,686,468 A * 10/1928 Rosenberg .................. 411/452
3,630,116 A * 12/1971 Harper ........................ 411/504
5,678,970 A * 10/1997 Caulk .......................... 411/504

* cited by examiner

*Primary Examiner*—Neill Wilson
(74) *Attorney, Agent, or Firm*—Curtis L. Harrington (57) ABSTRACT

The present invention provides the driving fit rivet made of aluminum, whereof, when driving in the rivet to caulk and joint without making a prepared hole on aluminum plates, no crack, no buckling, no seizure, and the like are caused, it is possible to caulk and joint aluminum plates with high operation efficiency and certainly, and it is superior in recycling, additionally it is possible to lighten products. The rivet is made of JIS (Japanese Industrial Standard) 6000 series aluminum alloy, and has a head and a shank, wherein surface hardness of said shank is Hv 135 or more.

3 Claims, 7 Drawing Sheets

Cross section

FIG. 6

(a) Measuring Position (b) Cross section

Cross section

Measuring Position (b)

Cross section

DRIVING FIT RIVET MADE OF ALUMINUM

FIELD OF THE INVENTION

The present invention relates to the driving fit rivet made of aluminum, wherein aluminum plates can be caulked and jointed with high operation efficiency and simplification of recycling and lightening of products can be possible even though the rivet is made of the same material as aluminum plates.

BACKGROUND ART

Hitherto, a driving fit rivet for caulking and jointing aluminum plates is generally made of iron steel or stainless steel in order to ensure joint strength and to prevent buckling the driving fit rivet itself when the rivet is drove in. However, the driving fit rivet made of iron steel or stainless steel had problems: whereof a crack is often caused on aluminum plates when the rivet is drove in at the time of jointing aluminum plates without making a prepared hole because the rivet hardness is higher than the aluminum plate's and the difference is large; also, an electric corrosion and coming a head off by a difference of a coefficient of thermal expansion are often caused because a different series of metal are used.

In resent years, since recycling of raw materials comes to be strongly demanded, and from a viewpoint of that simplification of distinguishing at the time of scraping, driving in to caulk and joint with using the rivet that is made of the same material as the aluminum plate is demanded; however, uniting with using a traditional rivet made of aluminum has a problem whereof mechanical strength is insufficient.

Moreover, for uniting aluminum plates that made of JIS 6000 series alloy, there are experiments whereof aluminum rivets, which are made of JIS 2000 series alloy and JIS 7000 series alloy that are possible to be thermal treated, are used; however, they have no practical use because a electric corrosion problem by potential difference occurs.

In order to solve said electric corrosion problem, using an aluminum rivet that made of the same JIS 6000 series alloy can be considered; however, the hardness of the aluminum rivet that made of the same JIS 6000 series alloy is only Hv from 110 to 120 or so, it is impossible to drive in and unite without making a prepared hole, and even if the prepared hole is made, there is a problem whereof the rivet itself fractures because rivet strength is weaker than work strength.

The object of the present invention is to provide the driving fit rivet made of aluminum whereof, when driving in the rivet to caulk and joint without making a prepared hole on aluminum plates, no crack, no buckling, no seizure, and the like are caused, it is possible to caulk and joint aluminum plates with high operation efficiency and certainly, and it is superior in recycling, additionally it is possible to lighten products of automobile, etc.

BRIEF SUMMARY OF THE INVENTION

In the present invention, the invention relates to claim 1 is the driving fit rivet made of aluminum, which is made of JIS 6000 series aluminum alloy, JIS 6000 series aluminum alloy means Al—Mg—Si series aluminum alloy prescribed in JIS (Japanese Industrial Standard) including JIS 6061, JIS 6N01, JIS 6063, JIS 6101, and JIS 6151; in U.S. standard, ASTM 6000 series aluminum alloy, ASTM 6061 and ASTM 6063; in German standard, DIN 6000 series aluminum alloy, EN AW-6061 and EN AW-6063; and in International standard (ISO), AlMg1SiCu and AlMg0.7Si, and has a head and a shank, wherein surface hardness of said shank is Hv 135 or more.

The invention relates to claim 2 is the driving fit rivet made of aluminum as claimed in claim 1, which is obtained by cold pressing a wire rod of JIS 6000 series aluminum alloy.

The invention that relates to claims 3 and 4 is the driving fit rivet made of aluminum as claimed in claim 1 or 2, wherein a hardening layer depth of a shank is from 0.01 to 0.30 mm.

The invention relates to claims 5 and 6 is the driving fit rivet made of aluminum as claimed in claim 1 or 2, wherein a hardening layer is formed on a shank surface with cold pressing by forming a irregularity whereof a longitudinal direction is the same as the axis direction.

The invention relates to claims 7 and 8 is the driving fit rivet made of aluminum as claimed in claim 1 or 2, which shank has hardness of two-layered structure whereof core hardness of the shank is approximately Hv from 110 to 120.

The invention relates to claims 9 or 10 is the driving fit rivet made of aluminum as claimed in claim 1 and 2, wherein a shape from a periphery of the head to the shank is a curved shape.

DETAILED DESCRIPTION OF THE INVENTION

Embodiments of the driving fit rivet made of aluminum that is related to the present invention will be explained based on the drawings.

Figure 1:
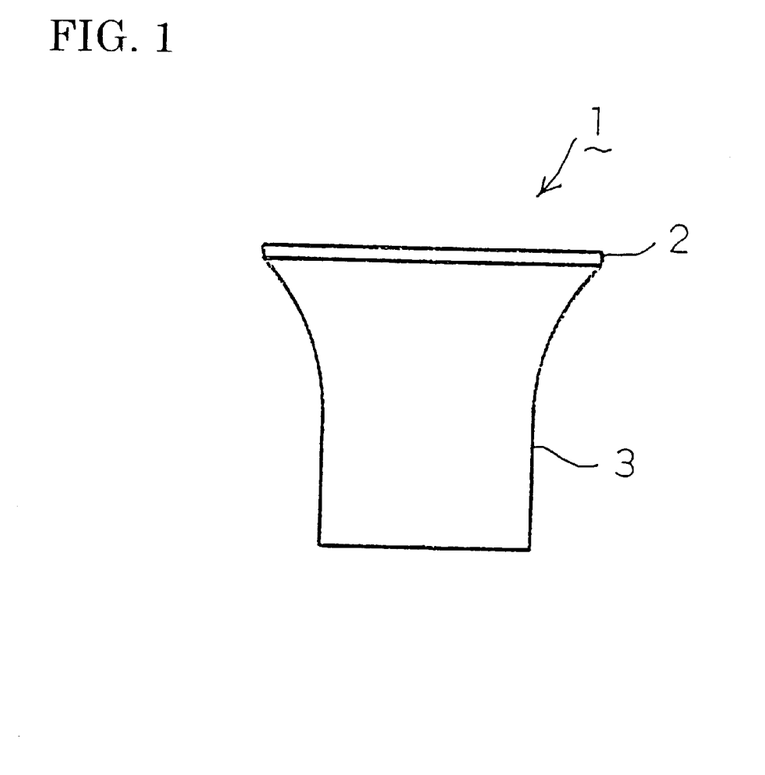
FIG. 1 is a front view showing the driving fit rivet made of aluminum that is related to the present invention.

The whole of the driving fit rivet made of aluminum (1) in the present invention is integrally made of JIS 6000 series aluminum alloy, and as shown in FIG. 1, it is consisted of a disc-like head (2) and a shank (3) which is stretched out to a down of said head (2) and presents column-like. Also, the neck shape from a periphery of the head (2) to the shank (3) is a curved shape (an arced shape), and this causes that it will be possible to drive in caulking easily and certainly.

JIS 6000 series aluminum alloy means Al—Mg—Si series aluminum alloy that is prescribed in JIS (Japanese Industrial Standard), and JIS 6061, JIS 6N01, JIS 6063, JIS 6101, and JIS 6151 are included in the series. JIS 6061 and JIS 6063 in the series are preferably used for this invention, JIS 6061 is the most preferably used.

Furthermore, aluminum alloy using for the driving fit rivet made of aluminum in the present invention is: in U.S. standard, ASTM 6000 series aluminum alloy, ASTM 6061 and ASTM 6063 are preferably used; in German standard, DIN 6000 series aluminum alloy, EN AW-6061 and EN AW-6063 are preferably used; and in International standard (ISO), AlMg1SiCu and AlMg0.7Si are preferably used.

Surface hardness of the shank (3) of the driving fit rivet made of aluminum (1) in the present invention is preferably Hv 135 or more in Vickers hardness, particularly preferably Hv 145 or more.

The reason of the above is that if Hv is less than 135, the shank (3) is often buckled when aluminum plates made of JIS 6000 series aluminum alloy are punched. For example, when two aluminum plates, each of which has a thickness of 1.5 mm, that is made of the extensible material of JIS 6061 are tried to be punched, the shank (3) buckles.

Said the driving fit rivet made of aluminum (1) whereof surface hardness of the shank (3) is Hv 135 or more in Vickers hardness can be obtained by cold pressing a wire rod of JIS 6000 series aluminum alloy. Concretely, it can be obtained with the process wherein the material obtained by cutting a wire rod of JIS 6000 series aluminum alloy to prescribed measure is compressive loaded from an axis direction and desired hardness is obtained then desired rivet shape is gotten by cold pressing.

Figure 2:
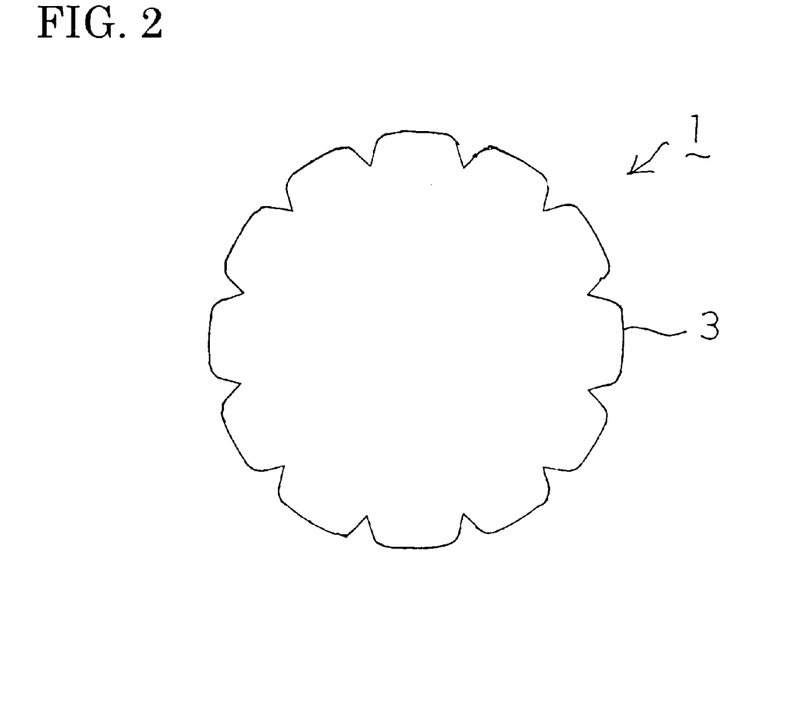
FIG. 2 is a view showing a irregularity shape which is formed on a shank surface of the driving fit rivet made of aluminum that is related to the present invention.

Moreover, it also can be obtained by the other process wherein after the material is compressive loaded from an axis direction and desired hardness is obtained as described above, it is compressive loaded from a diameter direction of the outside diameter of the material, and desired hardness is obtained on the shank surface by forming a irregularity whereof a longitudinal direction is the same as the axis direction, then desired rivet shape is gotten by cold pressing. Hereupon, for the irregularity shape forming on shank surface, the irregularity which is corrugated and continues circumferentially as shown in FIG. 2 is preferably adopted, and the depth of the concavity is, for example, about 0.2 mm as shown in the following embodiment (Table 7).

The driving fit rivet made of aluminum (1) which is obtained by said process has that: surface hardness of the shank (3) is Hv 135 or more; and core hardness is approximately Hv from 110 to 120, that is, the rivet has hardness distribution of a two-layered structure whereof a hardening layer of a certain depth is formed on the surface. In this case, the hardening layer depth of the shank (3) is from 0.01 to 0.05 mm that is deeply formed relatively; however, if said process whereof a irregularity is formed on the shank surface is adopted, it is preferable because the hardening layer from the shank surface to a deeper position can be formed. That is to say, for example, when the depth of the concavity is 0.2 mm, the hardening layer depth from the surface (convex) will be from 0.21 to 0.25 mm, the hardening layer depth from the surface is formed deeper than the case of no irregularity is formed on the surface. Furthermore, the hardening layer depth in this case can be set maximum 0.3 mm or so.

As the above, if a rivet is formed as that surface hardness is high and inside hardness is low on the shank (3), the rivet, whereof buckling is hard to cause and easy caulking is possible, is gotten.

Moreover, tensile strength of an axis direction (i.e. a vertical direction in FIG. 1) of the driving fit rivet made of aluminum (1) is preferably 200 or more MPa.

This is because if the tensile strength is less than 200 MPa, at the time of tensile force is imposed between jointed materials such as two aluminum plates jointed with the rivet (1), the rivet (1) is easy to be fractured, and the force whereof the jointed materials are caulked and jointed tightly and certainly is hard to be obtained.

Shearing strength of the shank (3) of the driving fit rivet made of aluminum (1) (i.e. shearing strength of a horizontal direction in FIG. 1) is preferably 260 or more MPa.

This is because if the shearing strength is less than 260 MPa, at the time of shearing force is imposed between jointed materials such as two aluminum plates jointed with the rivet (1), the rivet (1) is easy to be sheared and broken, and the force whereof the jointed materials are caulked and jointed tightly and certainly is hard to be obtained.

Figure 3:
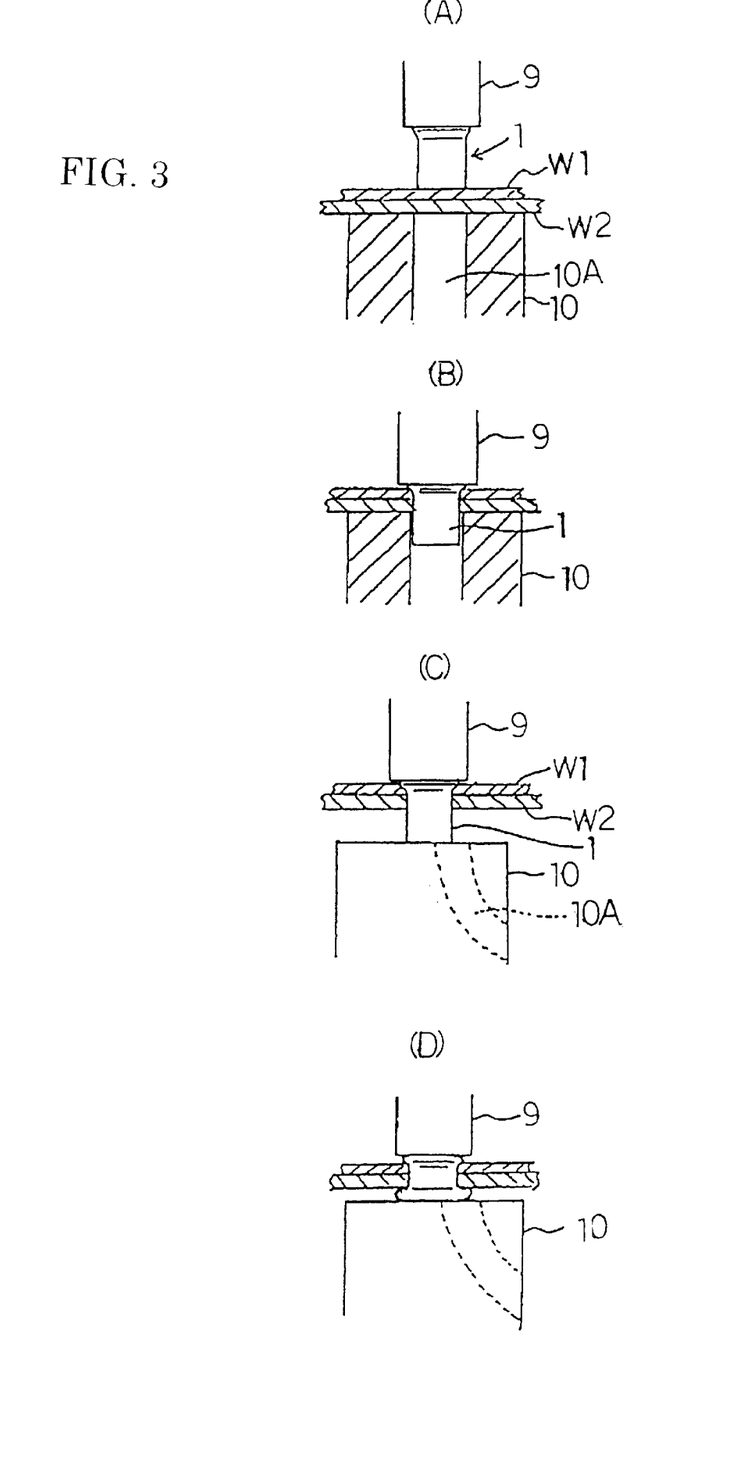
FIG. 3 is a schematic flow diagram showing caulking and jointing by the driving fit rivet made of aluminum.

As the above, the driving fit rivet made of aluminum (1) with high hardness and high strength in the present invention, whereof aluminum alloy is material, punches aluminum plates then caulks. In other words, without making a prepared hole on aluminum plates (W1) (W2), as shown in FIG. 3(A) (B) for example, firstly said aluminum plates (W1) (W2) is punched by descent of a punch (9) without causing like buckling the rivet, then a die (10) is revolved, and as shown in FIG. 3 (C) (D), caulking and jointing are carried out by descent of the punch (9) with high operation efficiency. Further, on the die (10), a port (10A) is disposed, whereof the shank of the driving fit rivet made of aluminum (1) is inserted at the time of punching and aluminum refuse is ejected.

Furthermore, a means for punching and caulking of the driving fit rivet made of aluminum that is related to the present invention is never be restricted to said means, of course. For example, a means for caulking is also adopted, whereof an automatic feeding apparatus of the driving fit rivet made of aluminum in order to get better operation efficiency is mounted on a rivet setter which works with two-stage action that caulking after punching, wherein a work such as aluminum plate is not punched by the driving fit rivet made of aluminum and the rivet is put into a prepared hole then a punch is pressed to extend the shank without breaking the work.

Moreover, a center hole from a tip to a halfway portion of the shank can be formed on the driving fit rivet made of aluminum within the limit of the present invention's point. Said portion is easy to be expanded and curled by caulking, and will act as a caulking portion whereof materials to be jointed is jointed.

Embodiment

The effect of the present invention will be described more clearly with showing embodiments and comparative example of the driving fit rivet made of aluminum that is related to the present invention. Note that the present invention is not restricted to the following embodiments.

(Embodiment Rivet)

The material, which was obtained by cutting a wire rod of JIS 6061 series aluminum alloy to prescribed measure, was compressive loaded from an axis direction and desired hardness was obtained, then a driving fit rivet made of aluminum, which has: a thickness T of the head is 0.5 mm;

a diameter of the shank is φ5 mm; and a length is 7.27 mm, was produced by cold pressing, and this was used as the driving fit rivet made of aluminum of embodiment 1.

Moreover, after the material, which was obtained by cutting a wire rod of JIS 6061 series aluminum alloy to prescribed measure, was compressive loaded from an axis direction and desired hardness is obtained, it was compressive loaded from a diameter direction, and desired hardness is obtained by forming a irregularity which is corrugated and continues on the shank surface, then a driving fit rivet made of aluminum, which has the same size of the embodiment 1's, was produced by cold pressing, and this was used as the driving fit rivet made of aluminum of embodiment 2.

(Comparative Example)

A driving fit rivet made of aluminum (Product name: alumisolidrivet 5×8.0, made by Fukui Byora Co., Ltd.), which has substantially same size as the embodiment's, was used as the rivet of the comparative example.

(Hardness Measurement)

The shank hardness of the rivet of the embodiment 1, 2, and comparative example was measured with using Vickers hardness measuring instrument (Microhardness Tester MVK-H3 made by Kabushiki kaisha Akashi, load 50 gf).

The measured result is shown in following tables from 1 to 11.

Figure 4:
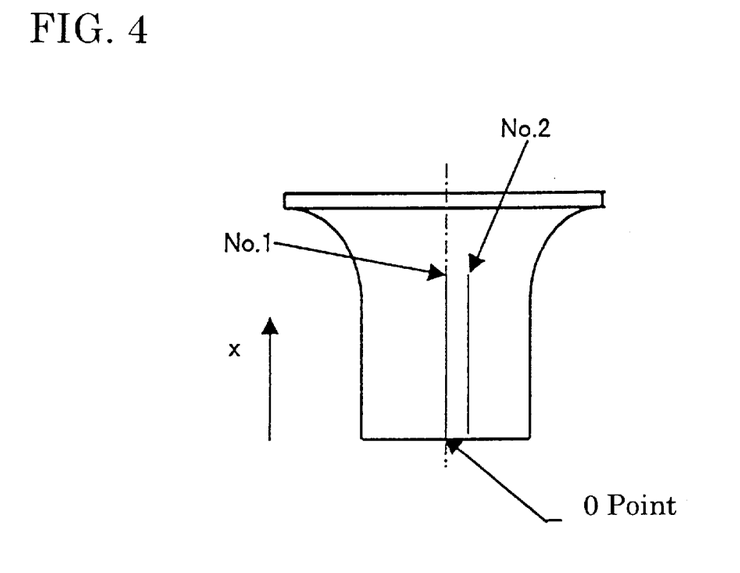
FIG. 4 is a view showing a measuring position of surface hardness of the embodiment 1's rivet.

Table 1 shows the measured result of surface hardness of the embodiment 1's rivet. As shown in FIG. 4, measuring points in this case were set: 0.7 mm; 1 mm; 1.2 mm; 1.7 mm; 2 mm; 2.2 mm; and 2.5 mm, respectively from the shank bottom in a head direction (the x direction in FIG.) on circumferential two places (No.1, No2).

TABLE 1

| x | No. 1 | No. 2 |
|---|---|---|
| 0.7 | 135 | 142 |
| 1 | 134 | 138 |
| 1.2 | 135 | 138 |
| 1.5 | 138 | 134 |
| 1.7 | 139 | 136 |
| 2 | 136 | 137 |
| 2.2 | 135 | 141 |
| 2.5 | 137 | 139 |
| Ave. | 136.1 | 138.1 |

Figure 5:
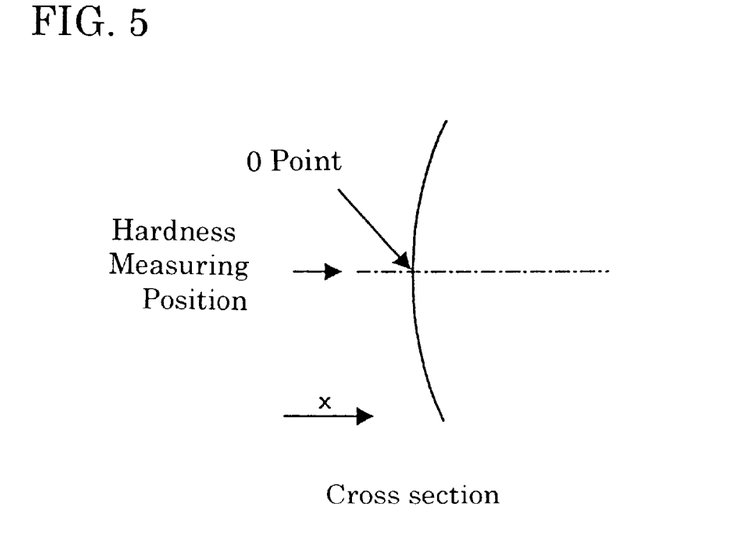
FIG. 5 is a view showing a measuring position of hardness that is related to depth from a surface of the embodiment 1's rivet.

Table 2 shows the measured result of hardness that is related to depth from a surface of the embodiment 1's rivet. As shown in FIG. 5, measuring points in this case were set: 0.01 mm; 0.02 mm; 0.03 mm; 0.04 mm; and 0.05 mm, respectively (the x direction distance) from the shank surface in the shank core direction (the x direction in FIG.), and measurement was carried out three times for each point.

TABLE 2

Measured Result of Hardness related to Depth from a Surface

| x | 1 | 2 | 3 | Ave. |
|---|---|---|---|---|
| 0 (Surface) | 142 | 138 | 134 | 138.0 |
| 0.01 | 142 | 134 | 133 | 136.3 |
| 0.02 | 145 | 138 | 132 | 138.3 |
| 0.03 | 139 | 135 | 129 | 134.3 |
| 0.04 | 131 | 126 | 135 | 130.7 |
| 0.05 | 124 | 131 | 131 | 128.7 |

Figure 6:
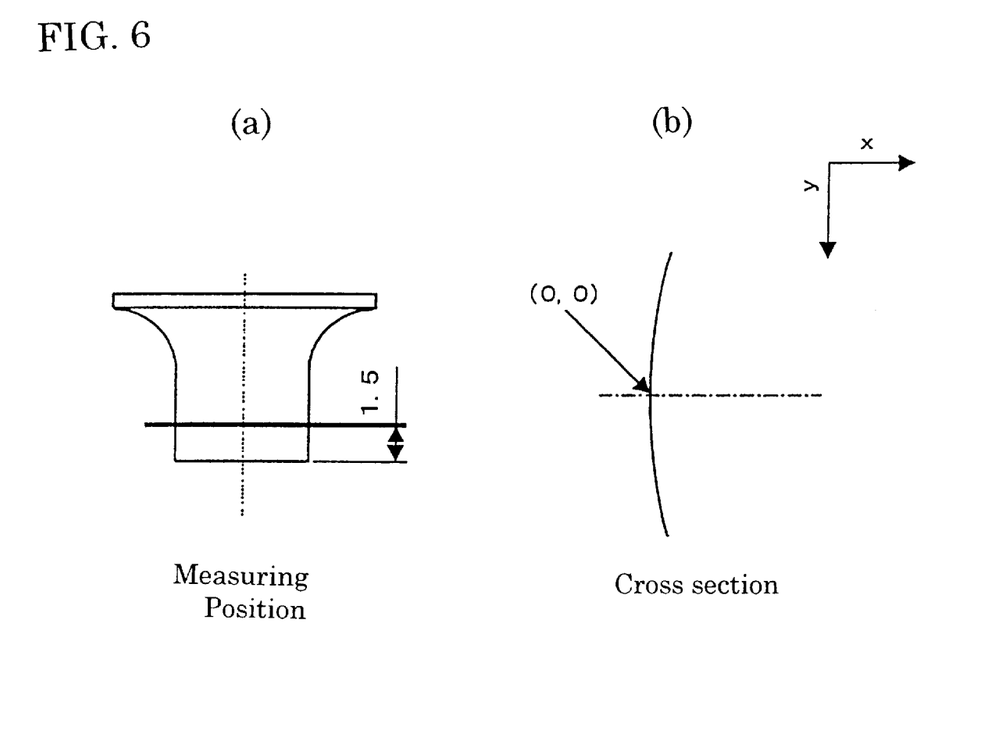
FIG. 6 is a view showing a measuring position of inside hardness of the embodiment 1's rivet.

Table 3 shows the measured result of inside hardness of the embodiment 1's rivet. At that time when, as shown in FIG. 6(b), one point on the shank surface was assumed as origin (0,0) and the shank core direction from the origin was called a x direction and a perpendicular direction of said x direction was called a y direction, measuring points in this case were set as shown in FIG. 6(a), in the x direction: 0.1 mm; 0.175 mm; 0.28 mm; 0.33 mm; 0.38 mm, and in the y direction: 0 mm; and 0.1 mm, respectively on a cross section which is at the position of 1.5 mm from the shank bottom in the head direction.

TABLE 3

| | x | | | | |
|---|---|---|---|---|---|
| y | 0.1 | 0.175 | 0.28 | 0.33 | 0.38 |
| 0 | 130 | 130 | 131 | 124 | 131 |
| 0.1 | 132 | 123 | 128 | 128 | 125 |

Also, Table 4 shows the measured result of core hardness of the embodiment 1's rivet. Further, measuring points are the same as that shown in FIG. 6 (however, the y direction has just one position), and (x, y) in the table correspond to the x direction and the y direction shown in FIG. 6.

TABLE 4

Core Hardness

| | x | | |
|---|---|---|---|
| y | 2.3 | 2.5 | 2.7 |
| 0 | 123 | 125 | 121 |

Figure 7:
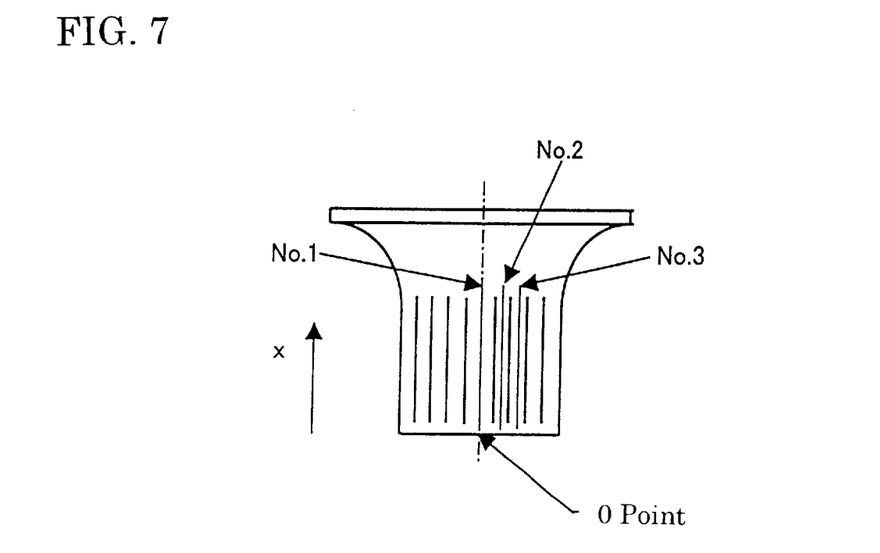
FIG. 7 is a view showing a measuring position of surface hardness of the embodiment 2's rivet.

Table 5 shows the measured result of surface hardness of the embodiment 2's rivet. As shown in FIG. 7, measuring points in this case were set: 0.7 mm; 1 mm; 1.2 mm; 1.7 mm; 2 mm; 2.2 mm; and 2.5 mm, respectively from the shank bottom in a head direction (the x direction in FIG.) on circumferential three places (from No.1 to No3).

TABLE 5

| x | No. 1 | No. 2 | No. 3 |
|---|---|---|---|
| 0.7 | 143 | 137 | 140 |
| 1 | 149 | 142 | 143 |
| 1.2 | 149 | 141 | 143 |
| 1.5 | 151 | 146 | 139 |
| 1.7 | 153 | 148 | 149 |
| 2 | 142 | 148 | 142 |
| 2.2 | 148 | 142 | 140 |
| 2.5 | 148 | 140 | 149 |
| Ave. | 147.9 | 143.0 | 143.1 |

Figure 8:
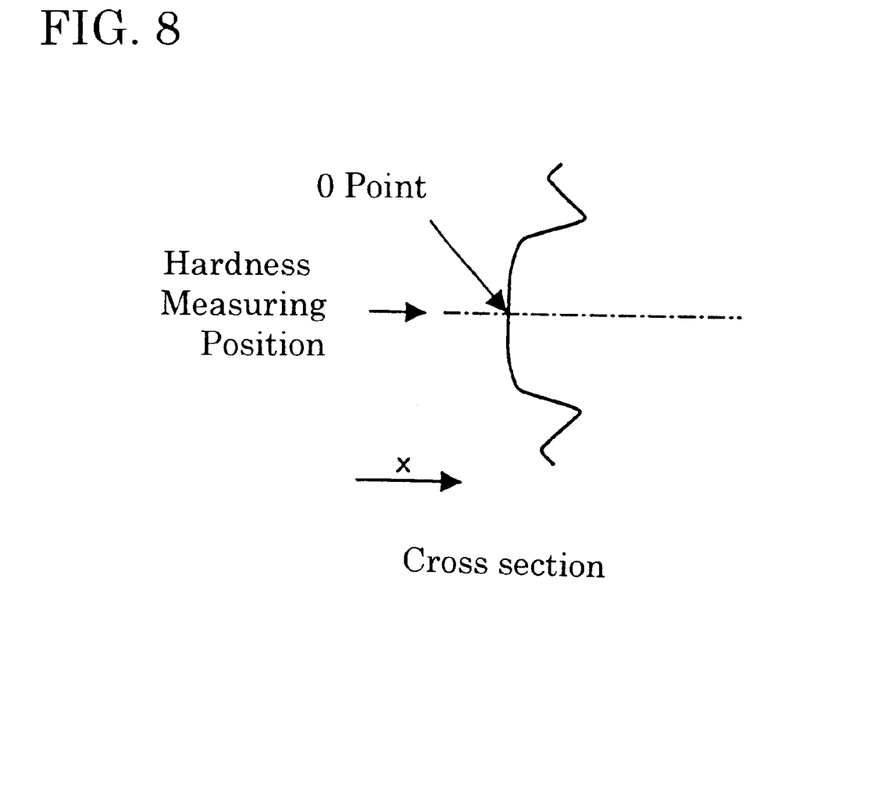
FIG. 8 is a view showing a measuring position of hardness that is related to depth from a surface of the embodiment 2's rivet.

Table 6 shows the measured result of hardness that is related to depth from a surface of the embodiment 2's rivet. As shown in FIG. 8, measuring points in this case were set: 0.01 mm; 0.02 mm; 0.03 mm; 0.04 mm; and 0.05 mm, respectively (the x direction distance) from the shank surface in the shank core direction (the x direction in FIG.), and measurement was carried out three times for each point.

TABLE 6

Measured Result of Hardness related to Depth from a Surface

| x | 1 | 2 | 3 | Ave. |
|---|---|---|---|---|
| 0 (Surface) | 149 | 143 | 144 | 145.3 |
| 0.01 | 143 | 138 | 137 | 139.3 |

TABLE 6-continued

Measured Result of Hardness related to Depth from a Surface

| x | 1 | 2 | 3 | Ave. |
|---|---|---|---|------|
| 0.02 | 139 | 135 | 134 | 136.0 |
| 0.03 | 135 | 133 | 131 | 133.0 |
| 0.04 | 134 | 132 | 126 | 130.7 |
| 0.05 | 132 | 128 | 124 | 128.0 |

Figure 9:
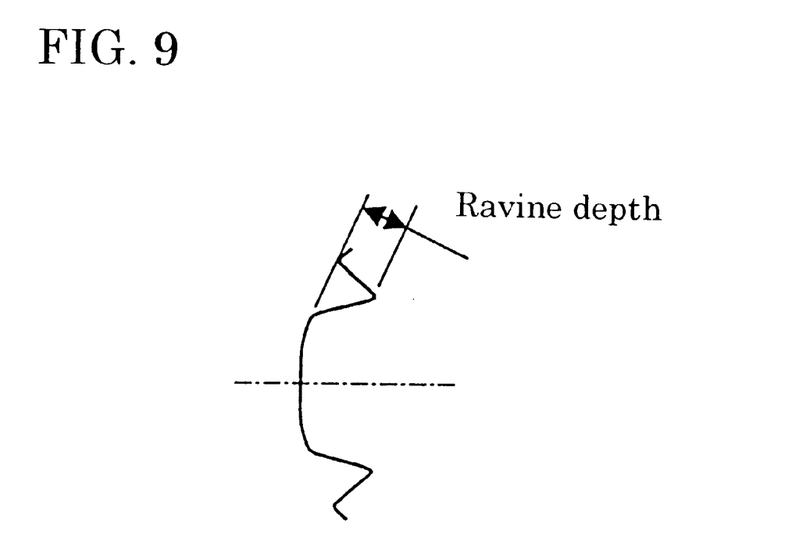
FIG. 9 is a view showing a measuring position of ravine depth of the embodiment 2's rivet.

Further, on the embodiment 2's rivet, all measurement of hardness was carried out at center positions (See FIG. 7 and FIG. 8) between ravines (concavities) of the irregularity formed on the shank. For reference, measured results of ravine depth (See FIG. 9) of the embodiment 2's rivet for four points (four ravines) are shown Table 7.

TABLE 7

Measured Results of Ravine Depth

| Ravine Depth 1 | 0.200 |
|---|---|
| Ravine Depth 2 | 0.185 |
| Ravine Depth 3 | 0.215 |
| Ravine Depth 4 | 0.211 |
| Ave. | 0.2028 |

Figure 10:
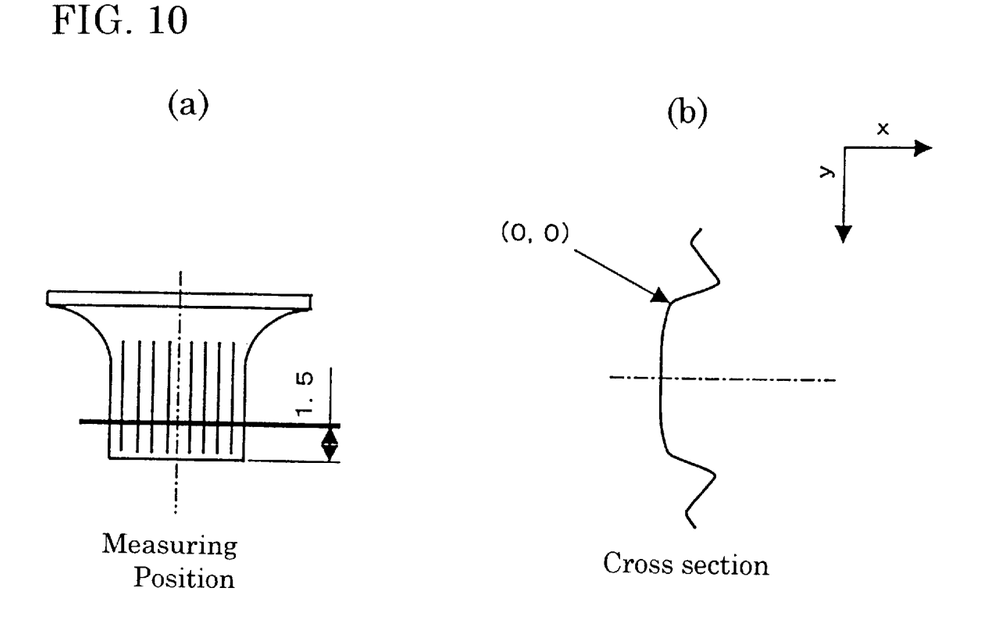
FIG. 10 is a view showing measuring position of inside hardness of the embodiment 2's rivet.

Table 8 and Table 9 shows the measured result of inside hardness of the embodiment 2's rivet. At that time when, as shown in FIG. 10(b), one point in a boundary area between a ridge and a ravine on the shank surface was assumed as origin (0,0) and the shank core direction from the origin was called a x direction and a perpendicular direction of said x direction was called a y direction, measuring points in this case were set as shown in FIG. 10(a), in the x direction: 0.1 mm; 0.175 mm; 0.28 mm; 0.33 mm, and in the y direction: −0.1 mm; −0.02 mm; 0.07 mm; 0.17 mm; 0.27 mm; 0.37 mm; 0.4 mm; 0.56 mm; and 0.74 mm, respectively on a cross section which is at the position of 1.5 mm from the shank bottom in the head direction, and measurement was carried out for two ridges (Ridge 1, Ridge 2) of the same rivet.

TABLE 8

Ridge 1

| | x | | | |
|---|---|---|---|---|
| y | 0.1 | 0.175 | 0.28 | 0.33 |
| −0.1 | | | | 126 |
| −0.02 | | 125 | | |
| 0.07 | 125 | | | |
| 0.17 | 121 | | | |
| 0.27 | 123 | | | |
| 0.37 | 133 | | | |
| 0.4 | | 128 | | |
| 0.56 | | | 131 | |
| 0.74 | | | | 131 |

TABLE 9

Ridge 2

| | x | | | |
|---|---|---|---|---|
| y | 0.1 | 0.175 | 0.28 | 0.33 |
| −0.1 | | | | 121 |
| −0.02 | | 125 | | |
| 0.07 | 121 | | | |

TABLE 9-continued

Ridge 2

| | x | | | |
|---|---|---|---|---|
| y | 0.1 | 0.175 | 0.28 | 0.33 |
| 0.17 | 127 | | | |
| 0.27 | 125 | | | |
| 0.37 | 131 | | | |
| 0.4 | | | | |
| 0.56 | | | 124 | |
| 0.74 | | | | 122 |

Also, Table 10 shows the measured result of core hardness of the embodiment 2's rivet. Further, measuring points are the same as that shown in FIG. 10 (however, the y direction has just one position), and (x, y) in the table correspond to the x direction and the y direction shown in FIG. 10.

TABLE 10

Core Hardness

| | x | | |
|---|---|---|---|
| y | 2.3 | 2.5 | 2.7 |
| 0.2 | 110 | 113 | 108 |

Table 11 shows the measured result of surface hardness of the comparative example's rivet. Measuring points in this case were set, in the x direction: 0.5 mm; 1 mm; 2 mm; and 2.5 mm, respectively in FIG. 4.

TABLE 11

| | No. | |
|---|---|---|
| x | 1 | 2 |
| 0.5 | 111 | 114 |
| 1 | 118 | 118 |
| 1.5 | 111 | 116 |
| 2 | 114 | 117 |
| 2.5 | 114 | 112 |
| Ave. | 113.6 | 115.4 |

Table 12 shows the measured result of surface hardness of the comparative example's rivet. Measuring points in this case were set, in the x direction: 0.1 mm, and in the y direction; −0.3 mm; −0.2 mm; −0.1 mm; 0 mm; 1 mm; 2 mm; and 3 mm, respectively in FIG. 6.

TABLE 12

| | x |
|---|---|
| y | 0.1 |
| −0.3 | 119 |
| −0.2 | 117 |
| −0.1 | 119 |
| 0 | 119 |
| 1 | 114 |
| 2 | 115 |
| 3 | 113 |

Also, Table 13 shows the measured result of core hardness of the comparative example's rivet. Further, measuring points are the same as embodiment 1's

TABLE 13

Core Hardness

| y \ x | 2.3 | 2.5 | 2.7 |
|---|---|---|---|
| 0.2 | 111 | 109 | 109 |

(Comparative Test)
1. Compressive Test

The rivets of embodiment 1, 2, and comparative example were compressed in an axis direction and each of the compressive strength (compressive yield points) was measured with a compressive tester MAX2000 kgf (loading rate: 30 mm/min.) made by Aikou Engineering. Further, the measurement was carried out three times for every rivet, and the average was found.

Figure 11:
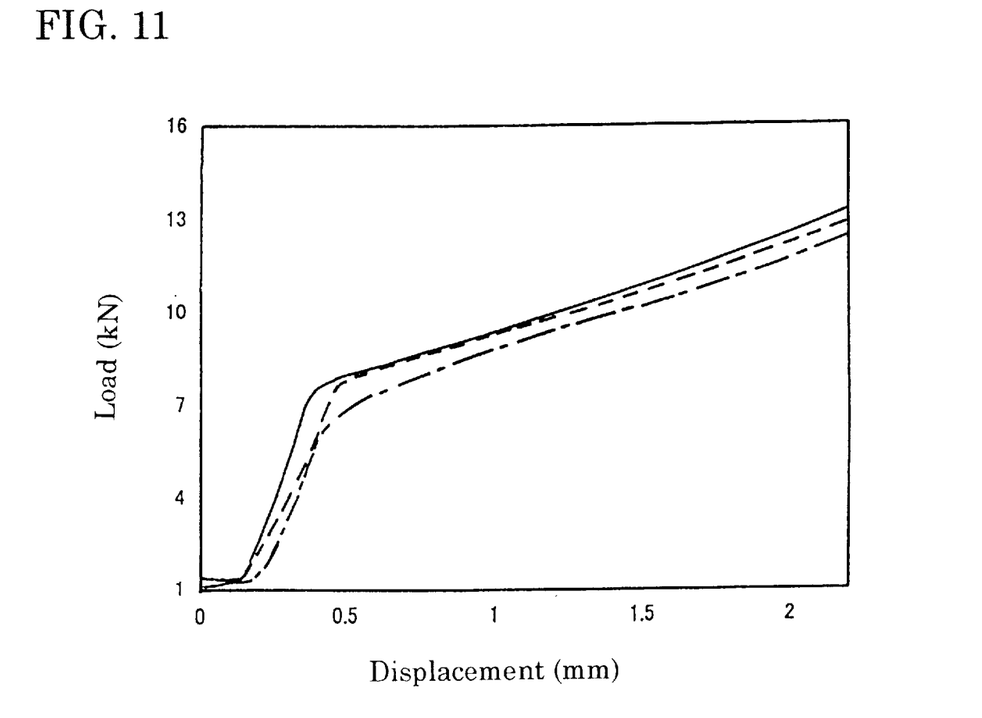
FIG. 11 is a graph showing a relationship between a load and a displacement.
Figure 12:
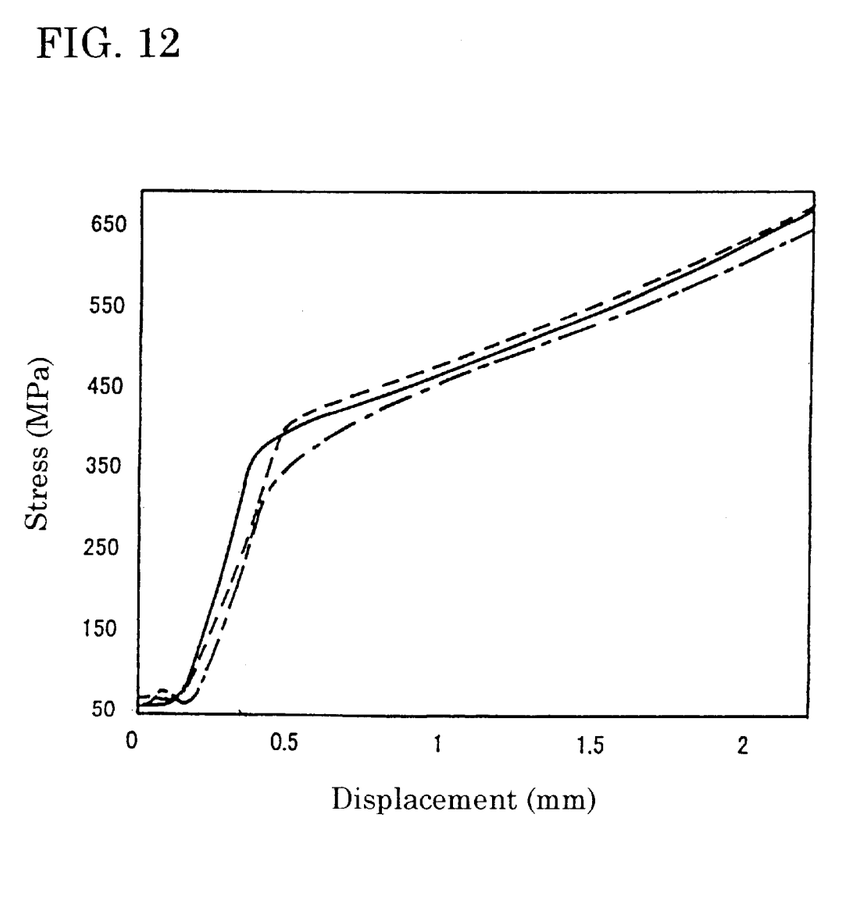
FIG. 12 is a graph showing a relationship between a stress and a displacement.

FIG. 11 is a graph showing a relationship between a load and a displacement, and FIG. 12 is a graph showing a relationship between a stress and a displacement. Further, a solid line, a dotted line, and a dotted chain line in the graph, show the embodiment 1, the embodiment 2, and the comparative example respectively. Also, values of load and stress at yielding are shown in Table 14 and Table 15.

TABLE 14

Load at Yielding (kN)

Load at Yielding Points

| No. | A Invention Embodiment 1 | B Invention Embodiment 2 | C Conventional Products |
|---|---|---|---|
| 1 | 7.4 | 7.7 | 6.3 |
| 2 | 7.4 | 8.1 | 6.4 |
| 3 | 7.5 | 7.8 | 6.6 |
| Ave. | 7.4 | 7.8 | 6.4 |

TABLE 15

Stress at Yielding (MPa)

Stress at Yielding Points

| No. | A Invention Embodiment 1 | B Invention Embodiment 2 | C Conventional Products |
|---|---|---|---|
| 1 | 377.0 | 404.5 | 334.1 |
| 2 | 374.5 | 427.3 | 336.7 |
| 3 | 382.0 | 410.8 | 349.6 |
| Ave. | 377.9 | 414.2 | 340.1 |

As cleared from the result of the compressive test, the driving fit rivets made of aluminum of embodiment 1 and 2 that are related to the present invention had higher compressive strength than the comparative example's rivet (a conventional product) had, and the embodiment 2's rivet had higher compressive strength than the embodiment 1's rivet had.

2. Tensile and Shearing Test

Prepared holes are made on two works, each of which was comprised by iron plate having a thickness of 1.5 mm, the rivets of embodiment 1 and comparative example were inserted to said holes respectively, and the two works are caulked and jointed.

Then the tensile strength and the shearing strength of the rivets are found by measuring load when the rivets are damaged with giving tensile force and shearing force to the caulked works at the rate of 30 mm/min.

Table 16, Table 17, Table 18, and Table 19 show the tensile test result of the embodiment 1, the shearing test result of embodiment 1, the tensile test result of the comparative example, and the shearing test result of the comparative example respectively.

TABLE 16

| No. | Load (kgf) | Tensile Strength (MPa) | (kgf/mm$^2$) |
|---|---|---|---|
| 1 | 408 | 214.0 | 21.8 |
| 2 | 397 | 208.3 | 21.3 |
| 3 | 400 | 209.9 | 21.4 |
| 4 | 422 | 221.4 | 22.6 |
| 5 | 424 | 222.4 | 22.7 |
| Average | 410.2 | 215.20 | 21.96 |
| Maximum | 424 | 222.4 | 22.7 |
| Minimum | 397 | 208.3 | 21.3 |
| Range | 27 | 14.2 | 1.4 |

TABLE 17

| No. | Load (kgf) | Shearing Strength (MPa) | (kgf/mm$^2$) |
|---|---|---|---|
| 1 | 528 | 277.0 | 28.3 |
| 2 | 529 | 277.5 | 28.3 |
| 3 | 497 | 260.7 | 26.6 |
| 4 | 508 | 266.5 | 27.2 |
| 5 | 513 | 269.1 | 27.5 |
| Average | 515.0 | 270.18 | 27.57 |
| Maximum | 529 | 277.5 | 28.3 |
| Minimum | 497 | 260.7 | 26.6 |
| Range | 32 | 16.8 | 1.7 |

TABLE 18

| No. | Load (kgf) | Tensile Strength (MPa) | (kgf/mm$^2$) |
|---|---|---|---|
| 1 | 367 | 183.3 | 18.7 |
| 2 | 372 | 185.8 | 19.0 |
| 3 | 356 | 177.8 | 18.1 |
| 4 | 340 | 169.8 | 17.3 |
| 5 | 381 | 190.3 | 19.4 |
| Average | 363.2 | 181.37 | 18.51 |
| Maximum | 381 | 190.3 | 19.4 |
| Minimum | 340 | 169.8 | 17.3 |
| Range | 41 | 20.5 | 2.1 |

TABLE 19

| No. | Load (kgf) | Tensile Strength (MPa) | (kgf/mm$^2$) |
|---|---|---|---|
| 1 | 521 | 260.2 | 26.5 |
| 2 | 549 | 274.2 | 28.0 |
| 3 | 501 | 250.2 | 25.5 |
| 4 | 514 | 256.7 | 26.2 |
| 5 | 514 | 256.7 | 26.2 |
| Average | 519.8 | 259.57 | 26.49 |
| Maximum | 549 | 274.2 | 28.0 |
| Minimum | 501 | 250.2 | 25.5 |
| Range | 48 | 24.0 | 2.4 |

As cleared from the result from Table 16 to Table 19, the embodiment 1's rivet was superior in the jointing strength (the tensile strength and the shearing strength), compared with the comparative example's rivet.

As described above, according to the driving fit rivet made of aluminum, because the surface hardness is Hv 135 or more, with neither using firearms like welder nor requiring time of making prepared holes, aluminum plates will be able to be caulked and jointed firmly with short time by the driving fit rivet made of aluminum, which is used the same material as aluminum plates. Also, because the same series of material is used, it will be possible to solve an electric corrosion problem and a problem of coming a head off, which is caused by a difference of a coefficient of thermal expansion, and jointing material, which is superior in recycling such as simplification of distinguishing at the time of scraping, will be able to be provided.

Further, because the driving fit rivet made of aluminum that is related to the present invention is superior in strength even though it is used the material which is the same series of the aluminum plate's, it is possible to prevent both cracking on aluminum plate and buckling of the driving fit rivet at the time of punching and caulking, and with no requiring a prepared hole, certainty and operation ability will be able to be improved. In addition, it is possible to be lightened compared with iron steel or stainless steel, and the condition whereof caulking is undertaken can be watched easily by eyes, this is convenience for safety check and the like.

Furthermore, the seizure of aluminum plate at the time of punching and caulking is little, and it will be possible to punch and caulk certainly without drawing-in the plate.

Moreover, because the hardening layer depth of the shank is from 0.01 mm to 0.30 mm, it will be hard to buckle and seize on plate at the time of caulking, additionally, because the rivet has hardness of two-layered structure whereof the core hardness of the shank is approximately Hv from 110 to 120, it will be hard to buckle and will be possible to caulk easily.

Also, because the irregularity whereof a longitudinal direction is the same as the axis direction is formed on the shank surface by cold pressing, the hardening layer is formed thicker, compressive strength will be superior, and it is possible to prevent buckling certainly.

In addition, because the shape from a periphery of the head to the shank is a curved shape, it will be possible to drive in and caulk against aluminum plate easily and certainly.

What is claimed is:

1. A driving fit rivet made of aluminum, having a head and a shank, said shank having a surface hardness of at least Hv 135 and a core hardness of from Hv 110 to 120 and a hardening layer depth of from 0.01 to 0.30 mm by cold pressing a material obtained by cutting a wire rod of JIS 6000 series aluminum alloy by compressive loading from an axial direction and from a diameter direction, wherein JIS 6000 series aluminum alloy means Al—Mg—Si series aluminum alloy prescribed in JIS (Japanese Industrial Standard) including JIS 6061, JIS 6N01, JIS 6063, JIS 6101, and JIS 6151; in U.S. standard, ASTM 6000 series aluminum alloy, ASTM 6061 and ASTM 6063; in German standard, DIN 6000 series aluminum alloy, EN AW-6061 and EN AW-6063; and in International standard (ISO), AlMg1SiCu and AlMg0.7Si.

2. The driving fit rivet made of aluminum as claimed in claim 1, wherein grooves having a longitudinal direction the same as an axis direction of said shank are formed on said shank by said cold pressing.

3. The driving fit rivet made of aluminum as claimed in claim 1, wherein a shape from a periphery of said head to said shark is a curved shape.

* * * * *

UNITED STATES PATENT AND TRADEMARK OFFICE
CERTIFICATE OF CORRECTION

PATENT NO. : 6,527,491 B1
DATED : March 4, 2003
INVENTOR(S) : Uchimoto et al.

Page 1 of 1

It is certified that error appears in the above-identified patent and that said Letters Patent is hereby corrected as shown below:

<u>Title page,</u>
Item [73], Assignee,
The assignee should be:
-- [73] Fukui Byora Co., Ltd.
  (A Japan Corporation)
  C/O Yukio Uchimoto
  59-115 Yubinaka, Kanazu-Cho
  Sakai-Gun, Fukui, 919-0898, JAPAN --

Signed and Sealed this

Eighth Day of June, 2004

JON W. DUDAS
*Acting Director of the United States Patent and Trademark Office*